July 30, 1968  R. L. FORK  3,395,365
FREQUENCY STABILIZED OPTICAL MASER
Filed Feb. 24, 1965  2 Sheets-Sheet 1
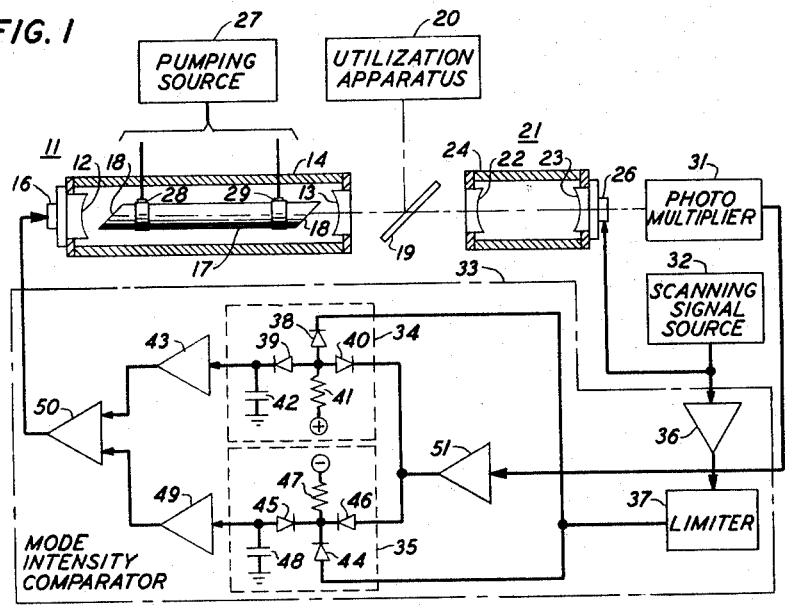
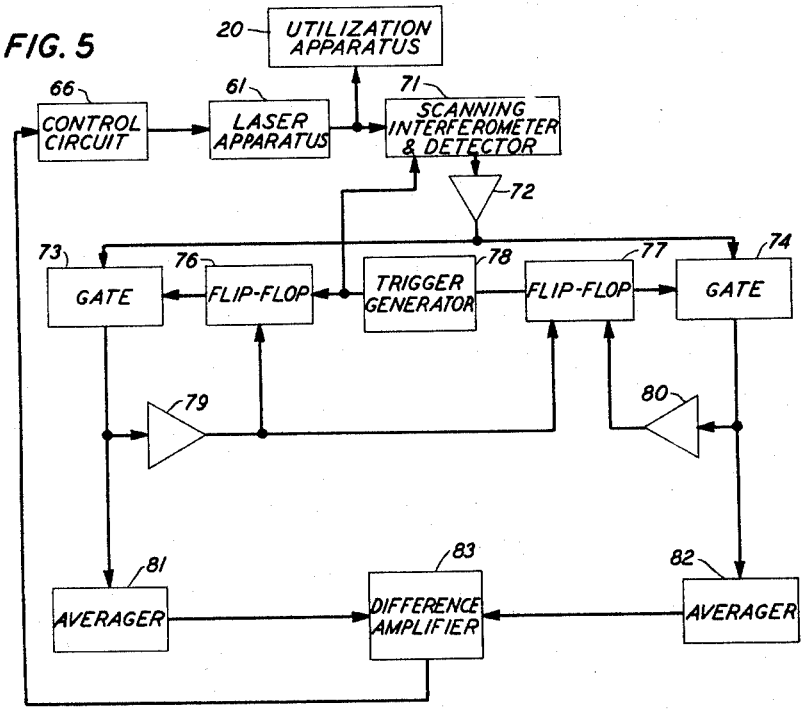
INVENTOR
R. L. FORK
BY
*Wilford L. Wisner*
ATTORNEY

United States Patent Office 3,395,365
Patented July 30, 1968

3,395,365
FREQUENCY STABILIZED OPTICAL MASER
Richard L. Fork, Plainfield, N.J., assignor to Bell Telephone Laboratories, Incorporated, New York, N.Y., a corporation of New York
Filed Feb. 24, 1965, Ser. No. 434,883
11 Claims. (Cl. 331—94.5)

ABSTRACT OF THE DISCLOSURE

In the frequency-controlled laser apparatus disclosed there is employed an active medium, typically a gas, characterized by a Doppler-broadened optical emission line and means for pumping the laser to produce oscillations in a pair of resonant modes illustratively symmetrically disposed about the center frequency of the emission line. The intensities of these modes are compared and are employed to tune the laser, illustratively to maintain equal intensities of the modes. In one embodiment, a scanning interferometer is varied iteratively to respond to the modes sequentially.

This invention relates to optical masers and more particularly to apparatus for controlling the output frequency of optical masers.

The development of optical masers or lasers, as they are now commonly known, has made possible the generation and amplification of coherent optical wave energy. Lasers operable in the optical portion of the spectrum typically comprise an optical cavity resonator in which there is disposed an appropriate active medium. Devices of this type were first disclosed by Schawlow and Townes in U.S. Patent No. 2,929,922. The properties of various types of laser resonators have been analyzed in articles in the Bell System Technical Journal. See, for example, articles by Fox and Li, volume 40, page 453; by Boyd and Gordon, volume 40, page 489; and by Boyd and Kogelnik, volume 41, page 1347.

The dimensions of laser resonators are generally on the order of several thousand times as large as the operating wavelength of the laser. They are, therefore, multimode devices capable of supporting a plurality of modes at distinct but relatively closely spaced optical frequencies as well as modes which, while all of a single frequency, differ in the propagation direction of the electromagnetic wave energy. The mode characteristics of laser resonators are, in general, strongly dependent upon their geometry and dimensions. As a result, the output of a cavity laser is subject to frequency variations resulting from mechanical and thermal, as well as other environmental fluctuations, that affect the geometry and dimensions of the device.

In many actual and potential applications of the laser, however, it is considered desirable that the laser output frequency have a high degree of stability. A frequency stabilized optical maser, for example, could provide a convenient optical frequency standard. The output of such a device could also provide a standard of length based upon optical wavelength. Although the above-mentioned applications of lasers are but examples, it may be said in general that the ultimate usefulness of the laser as a research tool and as a communications device is likely to be strongly affected by the precise frequency stability that may be achieved.

A system for controlling the output of a laser that oscillates simultaneously at several distinct frequencies within a single inhomogeneously broadened emission line is disclosed in United States Patent No. 3,170,122, issued to W. R. Bennett, Jr. on Feb. 16, 1965. The technique there disclosed is based upon the measurement of the difference between two beat frequencies generated from at least three actual wave modes having frequencies distributed about the center frequency of the emission line.

Another system employing feedback stabilization of a laser is disclosed in copending United States application, Ser. No. 376,960, filed June 22, 1964 by E. I. Gordon et al., and assigned to the assignee hereof. The technique of Gordon et al., which is applicable to lasers operating in a single mode at a unique frequency, is based upon deriving an error signal by subjecting different portions of the laser output beam to respective absorptions that are maximum at different frequencies and are equal at an intermediate frequency that is sharply defined by the substantially different rates of change of absorption with respect to frequency for the different portions of the beam.

The present invention, in contrast, is based on my discovery that, due to mode competition effects in the cavity resonator of a laser operating on a Doppler broadened emission line, the relative intensities of a pair of modes positioned on opposite sides of the center of the gain-frequency curve are extremely sensitive to fluctuations of the mode frequencies with respect to the line center.

The relative intensities of the two modes can be compared to indicate the deviation of the average of the two mode frequencies with respect to the center frequency of the emission line.

These indications derived from the intensity comparison of the two modes are applied in a feedback arrangement to stabilize the mode frequencies at symmetrically disposed positions with respect to the line center frequency. The line center frequency, which is determined by the inherent characteristics of the active material, provides a standard that is largely independent of the aforementioned thermal and mechanical disturbances; and the mode frequencies are stabilized with respect to this independent standard.

In one illustrative embodiment of the invention there is provided a laser having a tunable optical cavity resonator. The active laser medium is characterized by a substantially symmetrically Doppler-broadened optical emission line. Means are provided for observing the laser output over a frequency range corresponding to the Doppler-broadened line. Thus, the apparatus for observing the laser output sequentially detects the intensity of the laser output in modes having frequencies near the center of the emission line on either side thereof. Further means are provided for comparing the intensities of selected sequentially detected modes, for example, by deriving the difference therebetween. A signal corresponding to the mode intensity difference is then directed to appropriate means for tuning the laser. Similarly, the mode intensity ratio could be derived and applied to tune the laser.

The objects and features of the invention will be fully understood from the following more detailed discussion taken in conjunction with the accompanying drawing in which:

FIG. 1 depicts in schematic form an illustrative laser tuning system embodying the invention;

FIG. 5 is a block schematic diagram of another illustrative laser tuning system embodying the invention.

Figure 2:
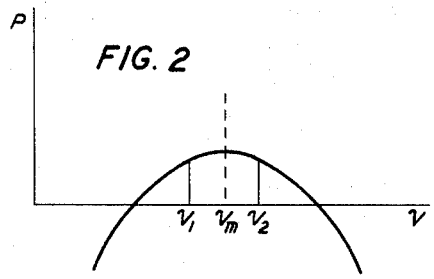
FIG. 2 shows a Doppler broadened emission line of an active material in the absence of a tuned resonant cavity and indicates the desired symmetrical disposition of a pair of mode frequencies with respect to the line center frequency.

In FIG. 1, an embodiment of the invention comprising apparatus for generating frequency-controlled coherent electromagnetic wave energy is shown in schematic form. The apparatus comprises a laser 11 having an optical cavity resonator formed by a pair of spaced reflectors 12 and 13. As illustrated in FIG. 1, reflectors 12 and 13 are spherically concave and the cavity resonator formed thereby is of the confocal or near-confocal type known in the art. It is to be understood however, that any known type of resonator capable of producing the type of output mode structure utilized in the invention and described in more detail below may be employed in place of the specific arrangement illustrated.

The reflectors 12 and 13 are mounted in a rigid frame 14 which fixes their spacing and optical alignment. The reflector 12 is, however, coupled to an electrically or magnetically controllable transducer 16 which is capable of varying the reflector position slightly to effect fine tuning of the cavity resonator. For example, transducer 16 may be a piezoelectric crystal or a magnetostrictive device arranged to move reflector 12 back and forth along the axis of the resonator. A tube 17 disposed within the resonator formed by the reflectors 12 and 13 contains an active medium which may comprise, for example, a gaseous mixture of helium and neon. Lasers employing other active media are, of course, known to workers in the laser art. The end windows 18 of the tube 17 are inclined at Brewster's angle to the axis of the resonator for the purpose of minimizing reflection losses and selecting a preferred direction of linear polarization for the laser light. The reflector 13 is partially transmissive to permit a portion of the laser light generated in the cavity resonator to be abstracted for utilization.

Pumping source 27 applies radio-frequency power to the gasous mixture through the electrodes 28 and 29, which encircle tubes 17. Pumping might also be achieved by direct-current power applied to the gaseous mixture.

In the embodiment shown in FIG. 1 part of the laser output is directed through a partially-silvered mirror 19 to a scanning interferometer 21; and the remainder of the laser output is reflected from the partially-silvered mirror 19 to a utilization apparatus 20. It is to be understood, however, that in place of the partially-silvered mirror 19 one of a variety of other means may be provided for transmitting to the interferometer 21 only that portion of the output required for operation of the control circuit while directing the remaining output portion to the utilization apparatus 20.

The scanning interferometer 21 comprises a pair of spaced reflectors 22 and 23 which are partially transmissive to the laser light. Reflectors 22 and 23 are mounted in a rigid frame 24. The length of the interferometer 21 is preferably somewhat less than that of the optical cavity resonator associated with the laser 11, thereby assuring that each mode pattern is detected only once during each variation of the interferometer tuning between its extremes. The reflector 23 is coupled to an electrically or magnetically controllable transducer 26 which is capable of varying the length of the interferometer 21 over a small range sufficient for the detection of both modes. Transducer 26 may be similar to transducer 16 and is coupled to a scanning signal source 32, which supplies a periodic signal for varying the position of reflector 23.

The portion of the laser output which is transmitted by the interferometer 21 is detected by a photomultiplier 31. While photomultiplier 31 is responsive to the intensity, i.e., power, of incident radiation, it is understood that any detector responsive to a wave-amplitude parameter could replace photomultiplier 31. Intensity is proportional to the square of wave amplitude. The output of the photomultiplier 31 provides a measure of the intensity of the laser output at the particularly narrow frequency range passed by the interferometer 21 at any particular instant. As the movable mirror 23 is driven by the transducer 26 under the control of the scanning signal source 32, the narrow light frequency range passed by the interferometer 21 is varied across the Doppler broadened laser emission line. Thus, the light falling on the photomultiplier 31 is sequentially indicative of the laser output intensity at the particular frequencies included within the emission line.

The output of the photomultiplier 31 is directed to a mode intensity comparator 33 where it is analyzed to determine the intensity difference of selected modes. The output of scanning signal source 32 is also directed to comparator 33 in order to channel each pulse from photomultiplier 31 into the appropriate branch of the comparator 33. A signal representative of the mode intensity comparison is applied by the comparator 33 to the transducer 16 to drive it in a sense which tunes the optical cavity resonator of laser 11 to oppose any deviation of the mode frequencies from the desired symmetrical disposition about the line center frequency.

More specifically, scanning signal source 32 may supply a sinusoidal signal. In comparator 33, an amplifier 36 and a limiter 37 are coupled in cascade to source 32 to convert this sinusoidal signal into a square wave having positive and negative excursions of equal and constant amplitude. The output of limiter 37 is coupled to the gating inputs of sample-and-hold circuits 34 and 35 to induce transmission conditions thereof in alternation. The output of photomultiplier 31 is coupled to the input of an amplifier 51; and the output of amplifier 51 is coupled to the signal inputs of sample-and-hold circuits 34 and 35. The outputs of sample-and-hold circuits 34 and 35 are coupled through isolation amplifiers 43 and 49 to different inputs of a difference amplifier 50. Sometimes called a differential amplifier, amplifier 50 may be of the type described in the copending application of R. V. Quinlan, Ser. No. 305,758, filed Aug. 30, 1963 and assigned to the assignee hereof.

Sample-and-hold circuit 34 comprises diodes 38, 39 and 40 having anodes connected in common. A resistor 41 is connected from a source of positive biasing potential to the common connection. The cathode of diode 38 is connected to the gating input of circuit 34 and thence to the output of limiter 37. The cathode of diode 40 is connected to the signal input of circuit 34 and thence to the output of amplifier 51. The cathode of diode 39 is connected to the output of circuit 34 and thence to the input of amplifier 43. A holding capacitor 42 is connected from the cathode of diode 39 to the reference potential point, i.e., ground, of the circuit in order to shunt the output of circuit 34.

Sample-and-hold circuit 35 comprises diodes 44, 45 and 46 having cathodes connected in common. A resistor 47 is connected from a source of negaitve biasing potential to the common connection of diodes 44, 45 and 46. The anode of diode 44 is connected to the gating input of circuit 35 and thence to the output of limiter 37. The anode of the diode 46 is connected to the signal input of circuit 35 and thence to the output of amplifier 51. The anode of diode 45 is connected to the output of circuit 35 and thence to the input of amplifier 49. A holding capacitor 48 is connected from the anode of diode 45 to the reference potential point, i.e., ground, of the circuit in order to shunt the output of circuit 35.

Utilization apparatus 20 may be, for example, measuring apparatus requiring one or more optical radiations having stabilized frequencies. Since the output of laser 11 includes two frequencies, apparatus 20 may include means for eliminating one of them if single-frequency operation is desired.

The pressure of the He-Ne gas mixture in laser 11 is illustratively between .2 and .7 torr. Gas pressures as low as reasonably obtainable appear advantageous for the purposes of the invention. There should be no stray magnetic fields within the tube 17. For the purposes of the invention, the laser 11 is excited or pumped by pumping source 27 at a sufficient power level to sustain two oscillatory wave modes having frequencies disposed on opposite sides of a reference frequency. For example, if only one mode is obtained when operation is started, the power level of source 27 should be increased until two modes are obtained.

For convenience of description, the frequencies of the two modes will be designated $\nu_1$ and $\nu_2$, $\nu_1$ being the lower frequency.

While it is desired to have $\nu_1$ and $\nu_2$ symmetrically disposed about the center frequency, $\nu_m$, of the Doppler broadened emission line, $\nu_1$ and $\nu_2$ will in general vary with every variation in the cavity length, L, between the reflectors 12 and 13, whether the variation is thermally or mechanically caused.

I have observed the intensity variations of the two sustained modes as the tuning of a laser such as laser 11 was varied in steps in either direction from the desired tuning. The observations were made by observing the output of the laser at each tuning step with a scanning interferometer, such as interferometer 21, until the intensities of each sustained mode could be detected. The intensities of the two sustained modes are plotted as functions of tuning, i.e., cavity length, L, in FIG. 3A.

At a cavity length $L=L_0$, the intensities of the two modes were observed to be equal, that is, $P_1=P_2$; and the frequencies $\nu_1$ and $\nu_2$ at this cavity length were observed to be symmetrically spaced about $\nu_m$. That is $$\frac{\nu_1+\nu_2}{2}=\nu_m$$

Figure 3A:
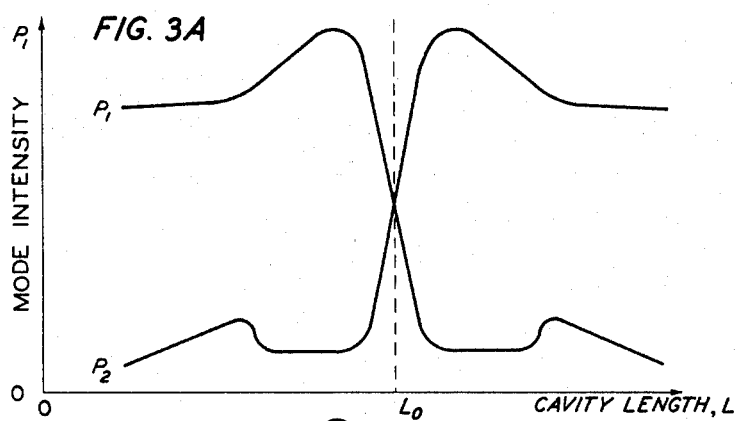
FIG. 3A shows intensity versus cavity length curves of a pair of modes for a laser that is tuned over a central portion of the Doppler broadened emission line of the active material.
Figure 3B:
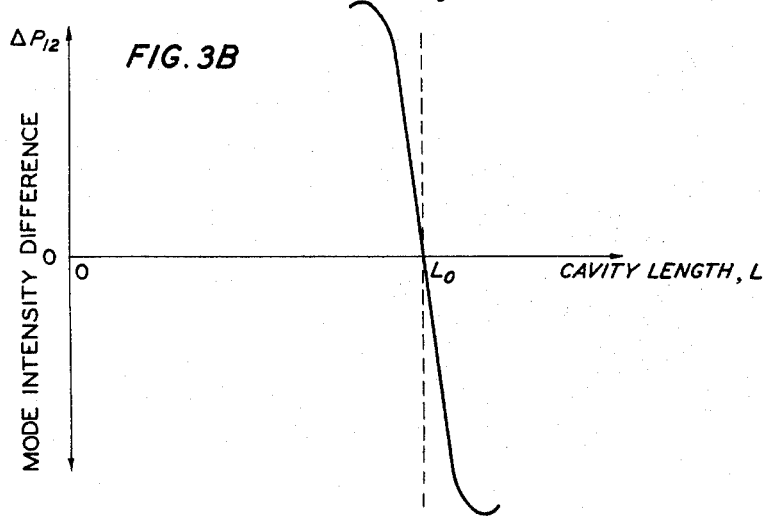
FIG. 3B shows a curve of the intensity difference versus cavity length for the curves of FIG. 3A.

Moreover, for a limited tuning range extending equally on both sides of the cavity length, $L_0$, the difference between the intensities, $\Delta P_{1,2}$, varies nearly linearly, as shown in FIG. 3B.

In operation, the embodiment of the invention depicted in FIG. 1 stabilizes the freqeuncy of laser 11 as follows. The power of pumping source 27 is increased until two modes are sustained in laser 11. A portion of the output of laser 11 is applied to utilization apparatus 20, and the remaining portion is directed through the partial reflectors 19 and 22 into interferometer 21. Scanning source 32 applies a sinusoidal periodic signal to the transducer 26, which in turn varies the position of the partially transmissive reflector 23 of interferometer 21. At a first particular position of reflector 23, a first one of the two sustained modes of laser 11 will produce constructive interference among its components at photomultiplier 31. At a second particular position of reflector 23, the other of the two sustained modes will produce constructive interference among its components at photomultiplier 31. As the signal from source 32 continues, photomultiplier produces a train of voltage pulses each of which is substantially proportional to the detected intensities of the two modes sustained by laser 11. The voltages, $Ep$, of these pulses are shown as a function of time in FIG. 4. It will be noted that pairs of measurements of one mode will alternate with pairs of measurements of the other mode, although each mode is detected only once for each peak-to-peak variation of the signal from source 32. Each mode appears twice in succession because, in general, the positive and negative peaks of the signal from source 32 are greater than necessary for detection of the two modes.

In order to channel the appropriate ones of these pulses to the appropriate branch of comparator 33, it is found convenient, in the embodiment of FIG. 1, to identify one of the two modes with the positive half of the signal from source 32 and to identify the other of the two modes with the negative half of the signal from source 32. This may be done by adjusting the mean position of reflector 23 in interferometer 21, that is, its position for zero signal from source 32, until it is appropriate for producing constructive interference at photomultiplier 31 in response to radiation at the line center frequency, $\nu_m$, which is characteristic of the active material of laser 11. Thus, in the operation of the circuit of FIG. 1, one of the modes will be detected during the positive half of the signal cycle of source 32 and the other mode during the negative half, despite the order of pulses shown in FIG. 4.

To achieve this result, amplifier 36 and limiter 37 produce a square wave with equal positive and negative values, one of which is concurrent with the positive half of the cycle from source 32 and the other of which is concurrent with the negative half of the cycle from source 32. Sample-and-hold circuit 34 is rendered transmissive in response to a postive output from limiter 37 and nontransmissive in response to a negative output from limiter 37, while sample-and-hold circuit 35 is gated to the opposite condition in each case. The alternation of transmission conditions of circuits 34 and 35 is, of course, attributable to the opposite relative polarities of diodes and bias sources therein.

Figure 4:
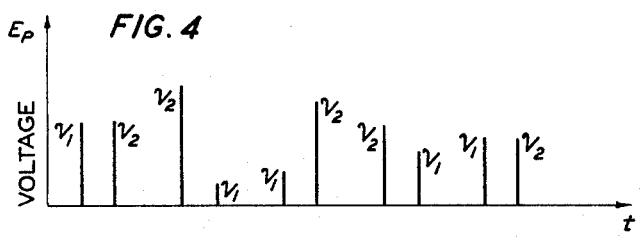
FIG. 4 is a plot of the mode intensities as sequentially detected in the embodiment of FIG. 1.

Each of the pulses shown in FIG. 4 now is transmitted through the appropriate one of circuits 34 and 35. For example, the first pulse corresponding to the mode of frequency $\nu_1$ may be detected while the output of limiter 37 is positive. This pulse passes through amplifier 51 and the conductive diodes 39 and 40 and is stored on capacitor 42. Diodes 45 and 46 are back-biased at this time by the voltage produced by current flowing through diode 44 and resistor 47 from limiter 37.

Before the next pulse, which corresponds to the mode of frequency $\nu_2$ as shown in FIG. 4, is detected, the signal from source 32 has passed through its zero value and the output of limiter 37 has reversed polarity, i.e., to its negative value. Thus, this pulse passes through amplifier 51 and the conductive diodes 45 and 46 and is stored on capacitor 48. Diodes 39 and 40 are nonconductive at this time. The third pulse shown in FIG. 4 is also detected during this half of the signal cycle; and, therefore, it alters the charge on capacitor 48 and is stored thereon until the sixth pulse shown in FIG. 4 is detected.

Thus, the operation continues with pulses corresponding to the $\nu_1$ mode charging capacitor 42 and pulses corresponding to the $\nu_2$ mode charging capacitor 48.

The voltages on capacitors 42 and 48 are amplified by buffer amplifiers 43 and 49, respectively; and the outputs of amplifiers 43 and 49 are applied to the input terminals of difference amplifier 50, which produces an output proportional to the difference of the outputs of amplifiers 43 and 49.

The output of amplifier 50 drives transducer 16 in a sense that moves reflector 12 in a direction to tend to equalize the detected intensities of the two sustained modes. As a result of this correction, the frequencies $\nu_1$ and $\nu_2$ of the two modes tend to be maintained symmetrically disposed about the line center frequency, $\nu_m$.

Various modifications can be made in the embodiment of FIG. 1. For example, the signal from source 32 can be a sawtooth instead of a sinusoid; and the operation of the circuit of FIG. 1 will be substantially the same. The signal from source 32 can also be nonperiodic, thereby merely changing the intervals between the pulses generated by photomultiplier 31.

It would also be possible to prevent half of the pulses produced by photomultiplier 31 from having any affect upon the feedback control. An alternative embodiment of the invention, in which this effect is achieved, is shown in FIG. 5.

In FIG. 5, laser apparatus 61 may be like laser 11 together with source 27 and transducer 16 of FIG. 1, scanning interferometer 71 may be like interferometer 21 of FIG. 1, and amplifiers 72 and 83 may be like amplifiers 51 and 50, respectively, of FIG. 1. Gate 73 together with averaging circuit 81 may be like sample-and-hold circuit 34, with the addition of a resistor in parallel with, or other filtering elements in combination with, capacitor 42. Gate 74 together with averaging circuit 82 may be like sample-and-hold circuit 35, with the addition of a resistor in parallel with, or other filtering elements in combination with, capacitor 48.

Laser 61 is coupled to scanning interferometer 71 in the manner illustrated for the like components in FIG. 1. Trigger generator 78 is coupled to interferometer 71 in the manner in which source 32 is coupled to interferometer 21 in FIG. 1. Trigger generator 78 preferably supplies a sawtooth wave with rapid recovery or "flyback" as utilized in television scanning. Trigger generator 78 is also coupled to one trigger input of each of flip-flops 76 and 77, which may be bistable multivibrators of any type. The output of flip-flop 76 is coupled to the gating input of gate 73 and adapted, as discussed hereinafter, so that gate 73 is made transmissive at the start of the ramp of the sawtooth from generator 78. Amplifier 72 couples interferometer and detector 71 to the signal input of gate 73 so that the first detected pulse passes through the gate 73. Amplifier 79 couples the output of gate 73 to a second trigger input of flip-flop 76 so that the arrival of the first pulse at the output of gate 73 changes the state of flip-flop 76 so that gate 73 becomes blocked or nontransmissive. Simultaneously, the first pulse changes the state of flip-flop 77 so that gate 74 is rendered transmissive. As the ramp of the sawtooth wave from generator 78 continues, the second sustained mode of laser apparatus 61 is detected. The resulting intensity-responsive pulse is applied by amplifier 72 to the signal input of gate 74, through which it then passes. Amplifier 80 is coupled from the output of gate 74 to a second trigger input of flip-flop 77, so that this second pulse is effective to change the state of flip-flop 77 to render gate 74 blocked or nontransmissive.

The sawtooth from generator 78 has now driven interferometer and detector 71 to respond sequentially to various frequencies within the emission line of laser apparatus 61 in one direction only, and each mode has been detected only once. During the "fly-back" or recovery of generator 78, both gate 73 and gate 74 are blocked or nontransmissive.

Preferably, the "fly-back" or recovery portion of the operation cycle is concluded by a "pip" or narrow pulse that changes the state of flip-flop 76 and renders gate 73 transmissive.

Thus, only one pulse is applied to averager 81 and only one pulse is applied to averager 82 during each operating cycle. These two different pulses are representative of the intensities of the respective modes. The averages of such pulses over several operation cycles appear at the outputs of averagers 81 and 82, which are coupled to different signal input terminals of difference amplifier 83. The output of difference amplifier 83 is coupled to the input of control circuit 66, to supply circuit 66 with a signal proportional to the difference of the mode intensities. Control circuit 66 is coupled to laser apparatus 61 to tune apparatus 61 in a sense that tends to reduce the difference in the mode intensities. As a result, the mode frequencies will tend to remain symmetrically disposed about the emission line center frequency.

Control circuit 66 may include means for providing proportional, derivative, or integral control or any combination thereof in response to the signal from amplifier 83, in fashion well known in the automatic control art; control circuit 66 may also include means for scheduling a variation of the two mode frequencies. The scheduling means may comprise a source of a time-varying reference voltage and means for comparing the output voltage of amplifier 83 with the time-varying reference voltage.

A variation of the embodiments of FIG. 1 or FIG. 5 would involve replacing difference amplifier 50 or 83 with a circuit for deriving the ratio of two input signals, in which case the desired tuning of the laser would be achieved for a unity ratio of the intensities of the two sustained modes.

I propose the following tentative theoretical explanation for the observed variations of mode amplitudes, as illustrated in FIG. 3A, although I do not wish my invention to be limited by this explanation.

Each mode within a laser, such as laser 11 in FIG. 1, involves a light wave that is multiply reflected between the reflectors that form the resonant cavity, i.e., reflectors 12 and 13. In order to sustain itself, each wave must interact with an appropriate velocity group of atoms under the influence of the pumping field. A velocity group of atoms is a group of atoms having components of velocity in a given range in the direction of propagation of the multiply reflected waves within the laser. It is generally supposed that the multiply reflected waves that form the two modes interact with different velocity groups of atoms, that is, a different group for each direction of travel for waves of each mode and different groups of atoms for a particular direction of travel as appropriate to the different frequencies of waves of different modes. Thus, in the general case of arbitrary tuning of the laser there appear to be four different groups of atoms involved in sustaining the two modes. Experimental evidence concerning the general case of tuning indicates that two sustained modes are "noncompeting." That is, the gain for one is relatively independent of the gain for the other.

However, in the special case in which the frequencies of the two waves are nearly symmetrically disposed about the center frequency of the Doppler broadened emission line, one of the waves traveling in one direction interacts with many of the same atoms within a given velocity group as does a wave of the other mode while traveling in the opposite direction. It appears that the success of one wave mode in deriving sustaining power tends to reduce the ability of the other wave mode to derive sustaining power. These modes are said to be "competing." So long as the cavity is tuned for balanced disposition of the mode frequencies, as described hereinbefore, whereby the unsaturated gains available to the two modes are balanced and the two modes are balanced in power, this competing effect does not upset the balance. But slight changes in the tuning of the cavity can make marked changes in their relative power level, as shown in FIG. 3A.

In principle, such competition between two symmetrically tuned modes should be obtainable with many other types of laser active material. A material such as the He-Ne gas mixture described hereinbefore is preferred because it is characterized by a so-called velocity broadened emission line. Such a gaseous mixture is advantageous because it prevents one mode from quenching the other in the unbalanced condition.

What is claimed is:

1. Apparatus for generating frequency controlled coherent electromagnetic wave energy comprising
   a laser having an optical cavity resonator and an active medium characterized by a Doppler broadened optical emission line,
   means for pumping said laser to produce oscillations in at least a pair of resonant modes at frequencies within said emission line,
   means for comparing wave amplitude parameters of said pair of modes,
   and means responsive to said comparing means for tuning said laser.

2. Apparatus for generating frequency controlled coherent electromagnetic wave energy comprising
   a laser having an optical cavity resonator and an active medium characterized by a Doppler broadened optical emission line,
   means for pumping said laser to oscillate in at least a pair of resonant modes within said emission line at frequencies above and below a reference frequency within said line,
   means for comparing wave amplitude parameters of a pair of said modes to derive a comparison function,
   said comparison function being a measure of the departure of said pair of mode frequencies from a particular disposition about said reference frequency, and means responsive to said comparison function for tuning said laser.

3. Apparatus for generating frequency controlled coherent electromagnetic wave energy comprising
a laser having an optical cavity resonator and an active medium characterized by a Doppler broadened optical emission line,
means for pumping said laser to oscillate in a plurality of resonant modes at frequencies within said emission line including a pair of competing modes at frequencies above and below the center frequency of said line,
means for detecting a function of the intensities of said pair of modes,
said function being a measure of the departure of said pair of modes from a particular disposition with respect to said center frequency of said emission line,
and means responsive to said function for tuning said laser.

4. Apparatus for generating frequency controlled coherent electromagnetic wave energy comprising
a laser having an optical cavity resonator and an active medium characterized by a Doppler broadened optical emission line,
means for pumping said laser to oscillate in at least a pair of resonant modes within said emission line at frequencies above and below a reference frequency within said line,
means for detecting the intensity difference of said pair of modes,
said difference being a measure of the departure of said pair of modes from a particular disposition about said reference frequency,
and means responsive to said intensity difference for tuning said laser.

5. Apparatus for generating frequency controlled coherent electromagnetic wave energy comprising
a laser having an optical cavity resonator and a gaseous active medium characterized by a velocity broadened optical emission line,
means for pumping said laser to oscillate in at least a pair of competing resonant modes at frequencies within said emission line,
and means responsive to wave amplitude parameters of said modes for tuning said laser.

6. Apparatus as claimed in claim 5 wherein said tuning means operates to maintain a prescribed relationship between the intensities of said modes.

7. Apparatus as claimed in claim 5 wherein said tuning apparatus operates to equalize the intensities of said modes.

8. Apparatus for generating frequency controlled coherent electromagnetic wave energy comprising
a laser having an optical cavity resonator and an active medium characterized by a Doppler broadened optical emission line,
means for pumping said laser to oscillate in at least a pair of resonant modes within said emission line,
means coupled to the output of said laser for sequentially measuring wave amplitude parameters of the modes of said pair,
and means responsive to said measuring means for tuning said laser.

9. Apparatus according to claim 8 in which the tuning means includes means for selectively directing the sequentially measured parameters according to the mode represented thereby.

10. Apparatus for generating frequency controlled coherent electromagnetic wave energy comprising
a laser having an optical cavity resonator and an active medium characterized by a Doppler broadened optical emission line,
means for pumping said laser to oscillate in at least a pair of resonant modes within said emission line at frequencies above and below the center frequency of said line,
a variable interferometer coupled to the output of said laser,
means for varying said interferometer iteratively to respond to said modes sequentially,
and means responsive to said interferometer modes for producing a continuous indication of the difference of the intensities of said modes.

11. Apparatus according to claim 10 including means responsive to said continuous indication producing means for tuning the laser.

No references cited.

JEWELL H. PEDERSEN, *Primary Examiner.*

W. L. SIKES, *Assistant Examiner.*